United States Patent
Shayovitz et al.

(10) Patent No.: US 11,163,053 B2
(45) Date of Patent: Nov. 2, 2021

(54) ADAPTIVE MITIGATION OF STATIONARY INTERFERENCE IN A VEHICULAR RADAR SYSTEM

(71) Applicant: GM GLOBAL TECHNOLOGY OPERATIONS LLC, Detroit, MI (US)

(72) Inventors: Shachar Shayovitz, Ness Ziona (IL); Yonattan Menaker, Gav Yam Park (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 381 days.

(21) Appl. No.: 16/181,753

(22) Filed: Nov. 6, 2018

(65) Prior Publication Data
US 2020/0142048 A1 May 7, 2020

(51) Int. Cl.
*G01S 13/44* (2006.01)
*G01S 13/931* (2020.01)
*G01S 7/02* (2006.01)
*G01S 13/524* (2006.01)
*G01S 13/89* (2006.01)

(52) U.S. Cl.
CPC ............ *G01S 13/449* (2013.01); *G01S 7/023* (2013.01); *G01S 13/5248* (2013.01); *G01S 13/89* (2013.01); *G01S 13/931* (2013.01)

(58) Field of Classification Search
CPC .... G01S 13/449; G01S 7/023; G01S 13/5248; G01S 13/89; G01S 13/931
See application file for complete search history.

(56) References Cited

U.S. PATENT DOCUMENTS

| | | | | |
|---|---|---|---|---|
| 5,663,720 A | * | 9/1997 | Weissman | G01S 13/91 340/905 |
| 8,970,426 B1 | * | 3/2015 | Stockmann | G01S 13/5244 342/159 |
| 2010/0245157 A1 | * | 9/2010 | Wicks | G01S 13/5248 342/162 |
| 2013/0082863 A1 | * | 4/2013 | Paglieroni | G01S 13/885 342/22 |
| 2017/0315229 A1 | * | 11/2017 | Pavek | G01S 13/931 |

* cited by examiner

*Primary Examiner* — Donald H B Braswell
(74) *Attorney, Agent, or Firm* — Cantor Colburn LLP

(57) ABSTRACT

A vehicle, radar system of the vehicle and method of operating the vehicle. A transmit antenna transmits a radio wave and a plurality of receive antennae receive echo radio waves from an object receptive to the transmitted radio wave, wherein the echo radio waves includes short-range interference. A processor generates a plurality of radar data arrays for the return signals, wherein each radar data array represents the return signal received at a corresponding receiver antennae, estimates an amount of short-range interference present in the return signal of each radar data array, subtracts the estimate of short-range interference from each of the radar data array to obtain a plurality of clutter-free radar data arrays, and detects the object using at least the plurality of clutter-free radar data arrays. A navigation system navigates the vehicle based on the detection of the object.

17 Claims, 7 Drawing Sheets

ADAPTIVE MITIGATION OF STATIONARY INTERFERENCE IN A VEHICULAR RADAR SYSTEM

INTRODUCTION

The subject disclosure relates to mitigation of stationary interference in a vehicular radar system. Radar reflections from a host vehicle, fascia, radome, and/or antenna housing can cause strong short-range echoes that can mask signal from actual objects; can saturate a radar receiver; and/or can shorten maximal detection range. Commonplace radar technologies have addressed the stationary interference arising from such short-range echoes based on a number of approaches. For example, in one approach, some detections by the vehicular radar system are classified as interference and, thus, range-Doppler Doppler bins corresponding to those detections are dismissed from any object and/or direction of arrival (DOA) analysis. In addition, or in an alternative approach, the vehicular radar system is shifted forward relative to the host vehicle, to avoid vehicle reverberations. Further, or in other approaches, zero Doppler mixer bias threshold is modified in order to mitigate the effects of stationary interference while removing DC leakage from Doppler processing. The foregoing approaches, however, present a number of shortcomings, including complete loss of detection capability; unviability of implementation in a moving vehicle; sensitivity to small vibrations of the host vehicle.

Accordingly, it is desirable to provide technologies for mitigation of stationary interference in a vehicular radar system.

SUMMARY

In one exemplary embodiment, the disclosure provides a method of operating a vehicle is disclosed. The method includes transmitting a radio wave from a transmit antenna of a radar system of the vehicle during motion of the vehicle, receiving, at a plurality of receive antennae of the radar system, return signals that include echo radio waves from an object receptive to the transmitted radio wave and short-range interference, generating a plurality of radar data arrays for the return signals, wherein each radar data array represents the return signal received at a corresponding receiver antenna, estimating an amount of short-range interference present in the return signal of each radar data array, subtracting the estimate of short-range interference from each of the radar data array to obtain a plurality of clutter-free radar data arrays, detecting the object using the plurality of clutter-free radar data arrays, and navigating the vehicle with respect to the object based on the detection of the object.

In addition to one or more of the features described herein, detecting the object further includes detecting at least one of a range and a direction of arrival of the object. In an embodiment, the plurality of radar data arrays includes respective range-Doppler maps, and estimating the amount of short-range interference further includes learning a stochastic model of the short-range interference based at least on one of the respective range-Doppler maps. Detecting the object further includes solving an optimization problem with respect to a maximum likelihood function based at least one of the plurality of clutter-free radar data arrays. The optimization problem can be solved with respect to an approximation of the maximum likelihood function. The approximation includes an incoherent summation over the plurality of clutter-free arrays. Estimating the amount of short-range interference further includes determining a clutter feature vector for a range-Doppler map, the clutter feature vector excluding a non-Doppler region of the range Doppler map.

In another exemplary embodiment, a radar system of a vehicle is disclosed. The radar system include a transmit antenna, a plurality of receive antennae and a processor. The transmit antenna transmits a radio wave from the radar system. The plurality of receive antennae receives echo radio waves from an object receptive to the transmitted radio wave, wherein the echo radio waves includes short-range interference. The processor is configured to generate a plurality of radar data arrays for the return signals, wherein each radar data array represents the return signal received at a corresponding receiver antennae, estimate an amount of short-range interference present in the return signal of each radar data array, subtract the estimate of short-range interference from each of the radar data array to obtain a plurality of clutter-free radar data arrays, and detect the object using at least the plurality of clutter-free radar data arrays.

In addition to one or more of the features described herein, the processor is further configured to detect the object by detecting at least one of a range and a direction of arrival of the object. In an embodiment, the plurality of radar data arrays includes respective range-Doppler maps, and the processor is further configured to estimate the amount of short-range interference by learning a stochastic model of the short-range interference based at least on one of the respective range-Doppler maps. The processor is further configured to detect the object by solving the optimization problem with respect to a maximum likelihood function based at least one of the plurality of clutter-free radar data arrays. The processor is further configured to solve the optimization problem with respect to an approximation of the maximum likelihood function. The approximation can be an incoherent summation over the plurality of clutter-free arrays. The processor is further configured to estimate the amount of short-range interference by determining a clutter feature vector for a range-Doppler map, the clutter feature vector excluding a non-Doppler region of the range Doppler map.

In yet another exemplary embodiment, a vehicle is disclosed. The vehicle includes a radar system and a navigation system. The radar system includes a transmit antenna, a plurality of receive antennae and a processor. The transmit antenna is configured to transmit a radio wave from the radar system. The plurality of receive antennae is configured to receive echo radio waves from an object receptive to the transmitted radio wave, wherein the echo radio waves includes short-range interference. The processor is configured to generate a plurality of radar data arrays for the return signals, wherein each radar data array represents the return signal received at a corresponding receiver antennae, estimate an amount of short-range interference present in the return signal of each radar data array, subtract the estimate of short-range interference from each of the radar data array to obtain a plurality of clutter-free radar data arrays, and detect the object using at least the plurality of clutter-free radar data arrays. The navigation system is configured to navigate the vehicle based on the detection of the object.

In addition to one or more of the features described herein, the processor is further configured to detect at least one of a range and a direction of arrival of the object. In an embodiment, the plurality of radar data arrays includes respective range-Doppler maps, and the processor is further configured to estimate the amount of short-range interference by learning a stochastic model of the short-range interference based at least on one of the respective range- Doppler maps. The processor is further configured to detect the object by solving an optimization problem with respect to a maximum likelihood function based at least one of the plurality of clutter-free radar data arrays. The processor is further configured to solve the optimization problem with respect to an approximation of the maximum likelihood function. The processor is further configured to estimate the amount of short-range interference by determining a clutter feature vector for a range-Doppler map, the clutter feature vector excluding a non-Doppler region of the range Doppler map.

The above features and advantages, and other features and advantages of the disclosure are readily apparent from the following detailed description when taken in connection with the annexed drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
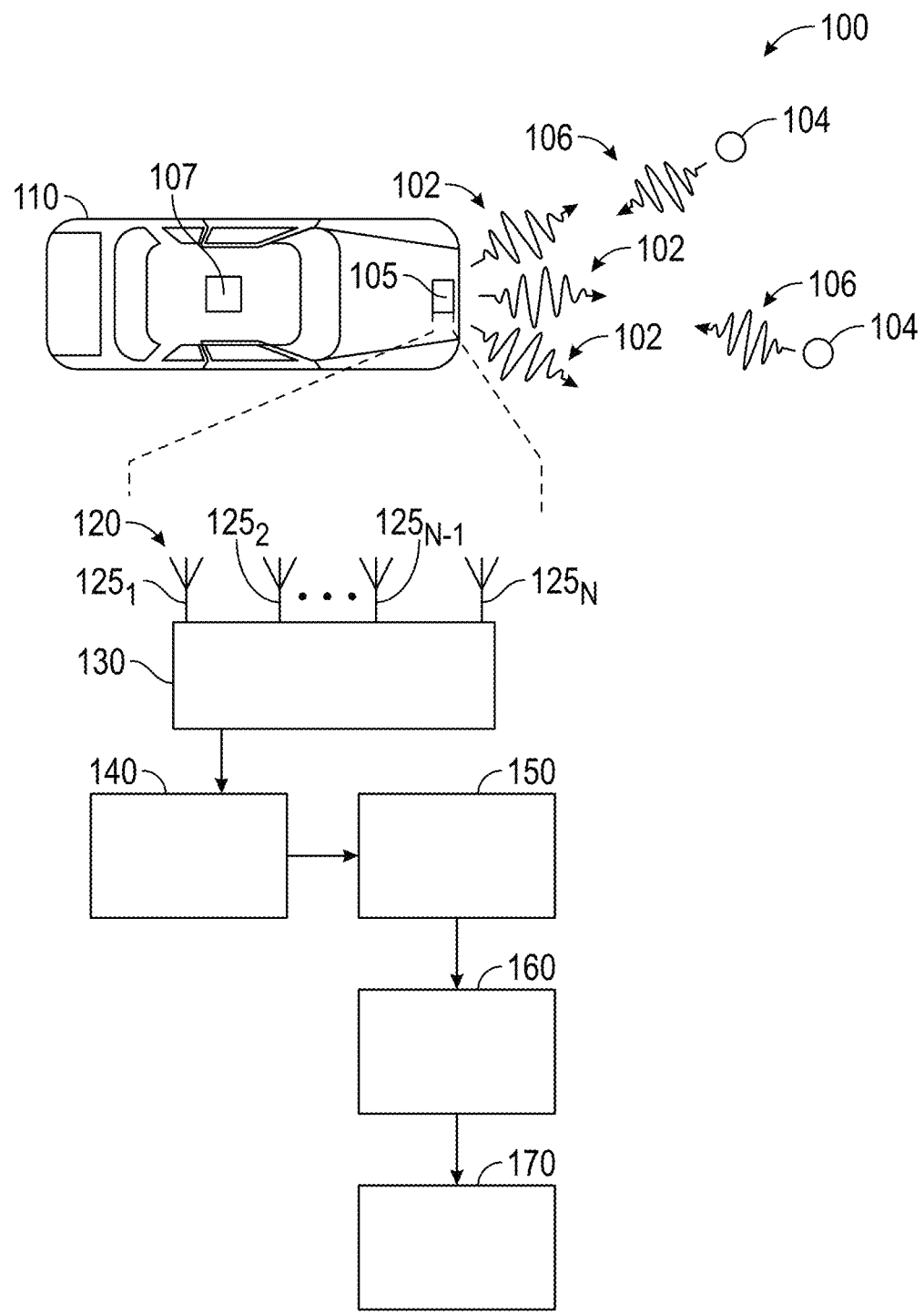
FIG. 1A presents an example of an operational environment for mitigation of stationary interference in a vehicular radar system, in accordance with one or more embodiments of the disclosure.

The following description is merely exemplary in nature and is not intended to limit the present disclosure, its application or uses. It should be understood that throughout the drawings, corresponding reference numerals indicate like or corresponding parts and features.

The disclosure recognizes and addresses, in at least some embodiments, the issue of mitigation of stationary interference in a vehicular radar system. Embodiments of this disclosure include systems, vehicles, and techniques that, individually or in combination, permit or otherwise facilitate adaptive mitigation of stationary interference in a vehicular radar system. More specifically, yet not exclusively, embodiments of the disclosure can learn a stochastic model of the stationary interference using range-Doppler data arrays observed by a vehicular radar system. The stochastic model can be specific to a receive channel and can permit adjusting an amount of stationary interference from a range-Doppler bin for the channel; thus, generating a second range-Doppler bin that is clutter-free, i.e. free of the stationary interference. Embodiments of the disclosure can utilize clutter-free range-Doppler maps to implement object detection. Such a detection can be based on a maximum likelihood (ML) detector or an approximation of the ML detector.

Embodiments of the disclosure are illustrated with reference to automobiles simply for the sake of illustrations. Indeed, the disclosure is not limited in that respect, and the principles and practical elements of this disclosure can be applied to other types of vehicles and moving objects.

With reference to the drawings, FIG. 1A presents an example of an operational environment 100 for adaptive mitigation of stationary interference in a vehicular radar system 105, in accordance with one or more embodiments of the disclosure. As is illustrated, the vehicular radar system 105 is mounted on a vehicle 110 and detect objects (moving or stationary) positioned relative to the vehicle 110. For example, a first one of the objects can be a vehicle (stationary or in motion) positioned relative to the vehicle 110 on the road; a second one of the objects can be a stationary structure, such as a tree, a utility post, a building, or the like; and a third one object can include a human, either a pedestrian or an operator of a vehicle (motorized or otherwise).

To that end, the vehicular radar system 105 can send first radio waves 102 into an environment of the vehicle 110. At least a portion of the first radio waves 102 can be reflected off one or more objects 104 in the environment of the vehicle 110 and can return to the vehicular radar system 105. A second portion of the first radio waves 102 can be reflected off structures contained in the vehicle 110, such as fascia of the vehicle 110 and/or radome or another type of housing that contains at least a portion of the vehicular radar system 105. During motion of the vehicle 110, the vehicular radar system 105 can remove at least some of the signal caused by the second portion of the first radio waves 102, thus reducing or even removing entirely the short-range interference caused by the second portion of the first radio waves 102.

More specifically, the vehicular radar system 105 can include a radar unit 130 that can send first radio waves 102 using at least an antenna array 120 having antennas $125_1$ to $125_N$ (N a natural number). To that end, at least one of the antennas $125_1$-$125_N$ can be a transmit antenna that sends the first radio waves 102. The radar unit 130 also can receive second radio waves 106 using the array of antennas $125_1$-$125_N$, the received second radio waves 106 being processed in a plurality of channels, each channel being associated with a respective antenna of the array of antennas $125_1$-$125_N$. As is disclosed herein, the second radio waves 106 can include radio waves reflected off the one or more objects 104. Further, the second radio waves 106 can include a portion of the first radio waves 102 that have been reflected off structures within the vehicle 110.

The radar unit 130 can include, in some embodiments, processing circuitry (not depicted in FIG. 1A) that can detect received radio waves at a defined sampling rate f (a real number in units of frequency). Thus, the radar unit 130 can generate a signal (analog or digital) in response to detected radio waves, where the signal has an in-phase (I) component and a quadrature (Q) component. The signal is representative of received radio waves and can be organized in frames. A frame is, or includes, a data structure that contains one or more datasets generated (by the processing circuitry, for example) in response to the signals generated at a defined instant or during a defined period. Accordingly, a frame corresponds to a defined instant during a detection interval. Each one of the dataset(s) includes in a frame includes complex data.

The vehicular radar system 105 also includes a range module 140 that can receive at least a portion of the signal (e.g., I/Q data) generated by the radar unit 130. In response, the range module 140 can generate range data by applying a discrete fast Fourier transform (FFT) to the received signal data. The range data pertains to the complex domain and is indicative or otherwise representative of a distribution of energy of received radio waves, as a function of range (R, a real number in units of length) from the vehicular radar system 105.

The vehicular radar system 105 also includes a Doppler module 150 that can receive range data and can generate Doppler-shift data as a function of range. To that end, the Doppler module 150 can apply a discrete FFT to the range data.

Figure 1B:
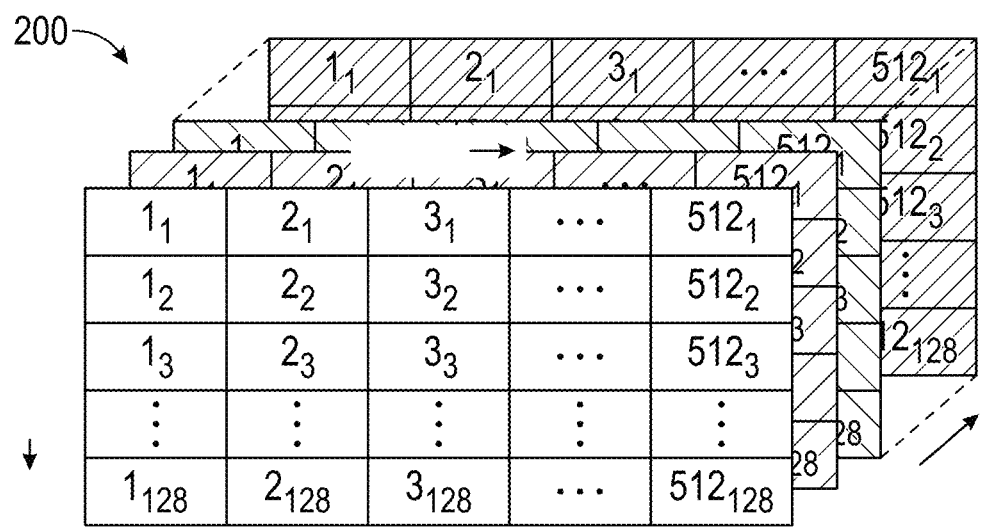
FIG. 1B shows a plurality of range-Doppler maps obtained from the range module and Doppler module for a plurality of channels corresponding to a plurality of radar antennae of the vehicular radar system.

FIG. 1B shows a plurality of range-Doppler maps obtained from the range module 140 and Doppler module 150 for a plurality of channels corresponding to the plurality of radar antennae $125_1$-$125_N$. Range-Doppler maps are obtained for a plurality of channels. The channels are show in a stacked array. The foremost range-Doppler map 200 shows bin numbering $X_y$, where the index X indicates a range bin index and the index y indicates a Doppler bin index. Output of the range module 140 and Doppler module 150 includes a range-Doppler maps having multiple range-Doppler bins. Each one of the range-Doppler bins is indicative or otherwise representative of an amount of electromagnetic (EM) energy received from a defined range, at a defined Doppler shift.

Referring back to FIG. 1A, the vehicular radar system 105 further includes a detector module 170 that can process a range-Doppler map and can determine if a defined amount of EM energy is present or absent at a range-Doppler bin (or cell). To that point, the detector module 170 can compare a complex datum corresponding to a defined range-Doppler bin and a threshold amount. In an instance in which a magnitude of the datum is, for example, greater than or equal to the threshold amount, the detector module 170 can establish a detection of EM energy at the defined range-Doppler bin. In contrast, in an instance in which the magnitude of the datum is, for example, less than the threshold amount, the detector module 170 can establish that noise is present in the range-Doppler bin.

Rather than providing (e.g., sending and/or making available) a range-directly from the Doppler module 150 to the Doppler array to the detector module 170, the vehicular radar system 105 includes an interference processing module 160 that can remove at least a portion of short-range interference that may be present in radio waves received at the radar unit 130. Accordingly, the interference processing module 160 can operate on data corresponding to a group of range-Doppler maps to generate an estimate of an amount of short-range interference during movement of the vehicle 110—and, thus, the vehicular radar system 105. The estimated amount of interference can be removed from each one (or, in some instances, at least one) of the group of range-Doppler maps, resulting in a second group of range-Doppler maps that are clutter-free or substantially free of short-range interference. A clutter-free range-Doppler maps refers to a range-Doppler map with short-range interference, or a stochastic model of the short-range interference, removed.

The interference processing module 160 can provide (e.g., send and/or make available) signals from the second group of range-Doppler maps to the detector module 170 for detection. Therefore, object detection and/or DOA detection using the second group of range-Doppler maps can be made more accurate relative to detection using the first group of range-Doppler maps that include stationary interference.

The vehicle 110 further includes a navigation system 107 that can be used to navigate the vehicle 110 based on results from the radar system 105. In particular, the radar system 105 can determined parameters of an object 104 using the second group of range-Doppler maps and provide the parameters to the navigation system 107. Parameters include range of the object 104, Doppler velocity of the object 104, azimuth location of the object 104, elevation of the object 104, etc. The navigation system 107 operates the vehicle 110 based on these parameters of the object 104. In general, the navigation system 107 navigates the vehicle 110 in order to avoid contact with the object 104 based on the parameters. In various embodiments, the navigation system 107 controls aspects of the vehicle 110 such as a steering system, vehicle speed and acceleration, braking, etc. in order to operating the vehicle 110.

Referring to FIG. 1B, bins with the same range-Doppler (RD) indices across all receive channels can be written as a sum of vectors as follows:

$$y = a(\theta)s + z + n. \tag{1}$$

Here, y represents a response vector of the antenna array 120 at a given range-Doppler (RD) bin; $a(\theta)$ represents a steering vector (or beamforming vector) at a defined azimuth angle $\theta$; s represents an unknown reflection from an object; z represents interference; and n represents thermal noise. The interference includes short-range interference arising from reflections off structures contained in the vehicle 110 or another vehicle that includes the vehicular radar system 105. The interference z can also include other sources of interference.

For each antenna, an array response vector for a detected object at azimuth angle $\theta_0$ is:

$$x = a(\theta_0)s + n \tag{2}$$

In order to estimate a direction of arrival (DOA) $\theta_0$, a normalized steering vector (or weight) $w(\theta)$ is defined as $$w(\theta) = \frac{a(\theta)}{\|a(\theta)\|} \tag{3}$$

where $\|\cdot\|$ is the magnitude function. The DOA $\theta_0$ can be determined by solving the following optimization problem:

$$\theta_0 = \underset{\theta}{\operatorname{argmax}} |w(\theta)^H x|^2 \tag{4}$$

In other words, the DOA is determined by the weight w that maximizes the power collected from the angle $\theta_0$. Here, $w(\theta)^H$ is the Hermitian of the weight $w(\theta)$.

Without intending to be bound by theory and simulation, in some embodiments, the thermal noise n and interference z can be assumed to be stochastic quantities that are mutually independent and represented by respective Gaussian distrutions, namely $n \sim CN(0,\sigma^2 I)$ and $z \sim CN(\mu_z, \Sigma_z)$. Here, C is a constant, $N(\cdot)$ represents a normal distribution function; $\sigma^2$ represents a standard deviation of the noise and I represents an N×N identity matrix. Further, $\mu_z$ and $\Sigma_z$ represent, respectively, a mean and covariance of the interference. Such quantities can be estimated by the vehicular radar system 105 (for example, by measuring the environment when there are no objects for a long time and estimating the mean and covariance using commonplace methods.

The detector module 170 can utilize or otherwise leverage a maximum likelihood (ML) estimator of the DOA given by a solution of the following optimization problem:

$$\hat{\theta} = \operatorname*{argmax}_{\theta} (\underline{y} - \underline{a}(\theta)s - \mu_z)^H \left( \sigma^2 I + \sum_z \right)^{-1} (\underline{y} - \underline{a}(\theta)s - \mu_z) \quad (5)$$

The optimization problem stated in the foregoing Eq. (4) can be solved by mean removal and whitening. Specifically, a new array response vector $\hat{y}$ representing the estimate of the response vector can be defined as $$\hat{y} = y - \mu_z \quad (6)$$

By utilizing single value decomposition (SVD) and defining $$WW^H = (\sigma^2 I + \Sigma_z)^{-1} \quad (7)$$

The foregoing optimization problem in Eq. (4) can be re-stated as follows:

$$\theta_0 = \operatorname*{argmax}_{\theta} \| W^H \hat{y} - W^H \underline{a}(\theta)s \|^2 \quad (8)$$

The re-stated optimizaton problem in Eq. (8) is the same as the same as the traditional DOA optimization problem, but with modified steering vectors and whitened centered array response. Therefore, the solution to the re-stated optimization problem in Eq. (8) is the following:

$$\hat{\theta} = \operatorname*{argmax}_{\theta} |\underline{a}(\theta) W W^H \hat{\underline{y}}|^2 \quad (9)$$

In some embodiments, the detector module 170 can solve the ML optimization problem in Eq. (9) to estimate direction of arrival.

In addition, or in other embodiments, the dector module 170 can implement a low-complexity incoherent detector and estimator of the direction of arrival. Without intending to be bound by theory and/or modeling, the interference vector can be considered to be uncorrelated. Thus, the covariance $\Sigma_z$ is a diagonal N×N matrix with N different variances $\{\sigma_1, \sigma_2, \ldots, \sigma_N\}$, where as mentioned, N is the number of receive channels in the vehicular radar system 105. The interference vector is uncorrelated and thus the covariance is a diagonal matrix with different variances along the diagonal:

$$\sum_z = \begin{pmatrix} \sigma_1^2 & 0 & 0 \\ 0 & \ldots & 0 \\ 0 & 0 & \sigma_N^2 \end{pmatrix} \quad (10)$$

Some receive channels can be noisier than other receive channels.

As a result, the estimator of DOA can be cast as the following optimization problem:

$$\hat{\theta} = \operatorname*{argmax}_{\theta} \left| a(\theta)^H \begin{pmatrix} \frac{1}{\sigma_1^2} & 0 & 0 \\ 0 & \ldots & 0 \\ 0 & 0 & \frac{1}{\sigma_N^2} \end{pmatrix} \hat{\underline{y}} \right| \quad (11)$$

The optimization problem in Eq. (11) can be stated equivalently as follows:

$$\hat{\theta} = \operatorname*{argmax}_{\theta} \left| \sum_{i=1}^{N} \frac{1}{\sigma_i^2} a_i(\theta)^* \hat{\underline{y}}(i) \right| \quad (12)$$

The complexity of the optimization problem in Eq. (12) can be reduced by performing an incoherent weighted summation over receive channels, resulting in the following simplified optimization problem.

$$\hat{\theta} = \operatorname*{argmax}_{\theta} \sum_{i=1}^{N} \frac{1}{\sigma_i^2} |\hat{y}(i)| \quad (13)$$

The best estimate of the interference signal is calculated at each time step. Incoherent summation is performed after the uncorrelated interference signals have been estimated and subtracted.

The detector module 170 can solve the foregoing optimization problem in Eq. (13) in order to estimate direction of arrival. In such scenarios, the detector module 170 can be referred to as an in-coherent detector.

Without intending to be bound by theory and/or modeling, as it can be gleaned from Eq. (5), stationary interference can be mitigated in a vehicular radar system 105 by estimating an amount of interference and removing the estimated amount of interference from received echo radio waves, during movement of the vehicle 110. To that end, as it can be gleaned from Eq. (6), a stochastic model of interference can be learned at zero Doppler shift and a defined group of small Doppler shifts. As is disclosed herein, such a model can be characterized by the mean $\mu_z$ (for each receive channel) and the covariance matrix $\Sigma_z$. The parameter $\sigma$ is generally not accounted for in the model, because it is generally negligible for close range targets due to high signal-to-noise ratios for close range targets.

More specifically, in some embodiments, for each receive channel, $\mu_z$ and $\Sigma_z$ can be learned for a non-Doppler region in a range-Doppler map. The non-Doppler region includes a group of defined low-lying (e.g., small) Doppler shifts.

Figure 2A:
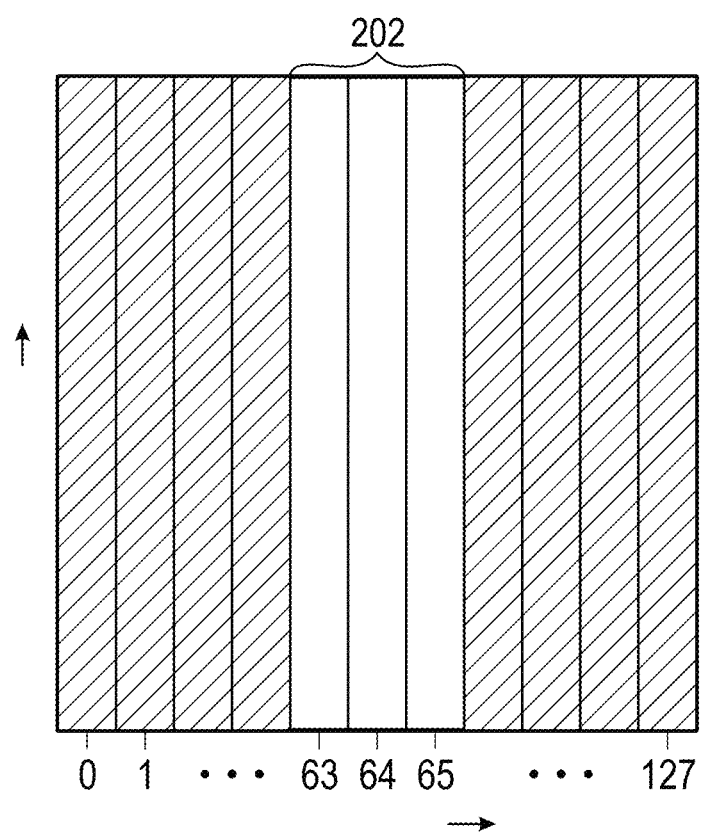
FIG. 2A presents an example of a range-Doppler map, including defined low-lying Doppler shifts, utilized for mitigation of stationary interference in a vehicular radar system, in accordance with one or more embodiments of the disclosure.

FIG. 2A shows an illustrative range-Doppler map that includes a plurality of Doppler bins. Non-Doppler zero area bins 202 that include a zero Doppler shift and/or smallest magnitude Doppler shifts; namely, $\{-\Delta v, 0, \Delta v\}$ are highlighted.

Figure 2B:
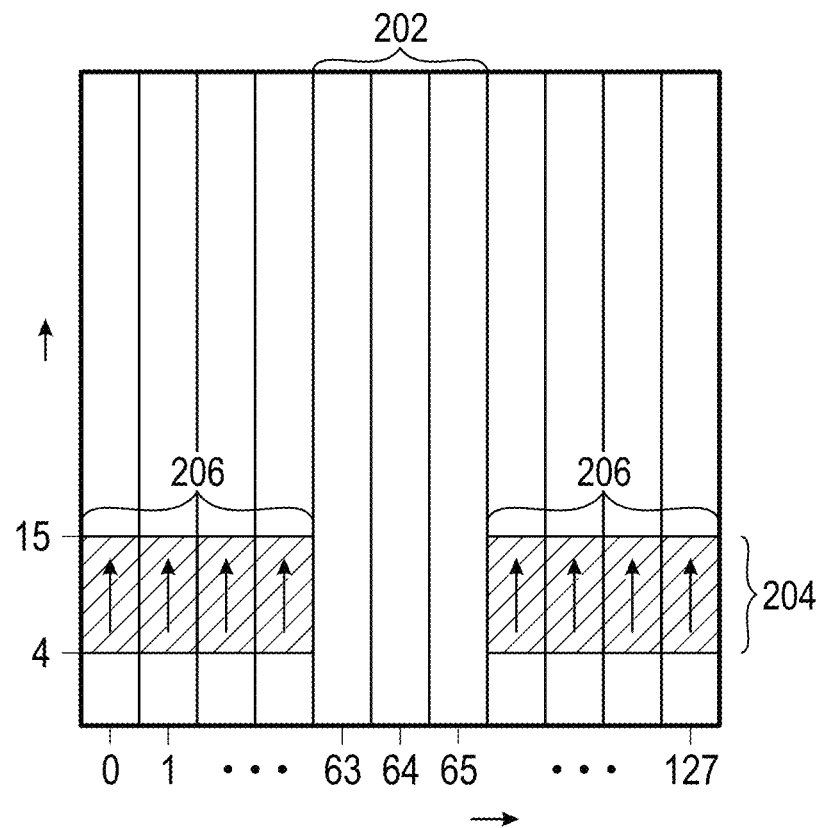
FIG. 2B presents another example of range-Doppler map utilized for mitigation of stationary interference in a vehicular radar system, in accordance with one or more embodiments of the disclosure.
Figure 2C:
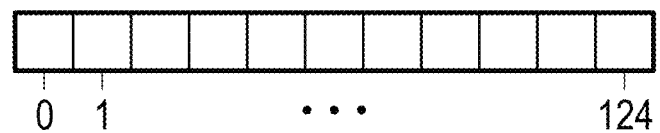
FIG. 2C shows a clutter feature vector derived from summation across various range bins of the range-Doppler map of FIG. 2B.

FIG. 2B shows the range-Doppler map of FIG. 2A with selected range bins 204. Upon or after configuration of the non-Doppler zero area bins 202, the interference processing module 160 determines a clutter feature vector (due to road clutter, fascia clutter, etc.) using range bins over a selected range at Doppler bins 206 that exclude the non-Doppler zero area bins 202. In the example of FIG. 2B, range bins from range bin 4 to range bin 15 are selected over all of the Doppler bins except Doppler bins 63, 64 and 65. However, the selected range bins shown in FIG. 2B are for illustrative purposes only. For each Doppler bin, the values of the selected range bins (e.g., from range bins 4 to range bin 15) are summed to create a value for a clutter feature vector shown in FIG. 2C. The clutter feature vector is used to determine whether or not the vehicle is in motion with respect to a selected bounds of motion. The bounds of motion are selected to define a motion at which echo signals are separated from the interference signals. The bounds of motion are selected to ensure that none of, or very little of, the signals from the static part of the environment reside in zero Doppler bins. Each component of the clutter feature vector is a sum of energy across all selected ranges, normalized by the number of ranges n. Due to the exclusion of Doppler bins 63, 64 and 65, the length of the clutter feature vector is 124, i.e., three less than the number of range bins in FIGS. 2A and 2B.

The interference processing module 160 estimates interference signals and subtracts interference signals prior to the incoherent summation of signals in the detector.

With further reference to FIG. 1A, the interference processing module 160 also can apply thresholds to a clutter feature vector in order to identify Doppler bins which contain road clutter. This is then used to estimate the speed of the vehicle. Over a certain speed, the zero Doppler bin (i.e., the Doppler bin representing zero relative speed) contains returns from stationary interference signals and not the environment. A low value of a component of the clutter feature vector can indicate a return associated with clutter/fascia and a high value can originate from threshold bias. Specifically, the interference processing module 160 can apply a first threshold (e.g., 35 decibels (dB)) in order to assign a binary value (e.g., 1 or 0) to a Doppler shift (or Doppler bin). A binary value of 1 is indicative of the Doppler bin containing clutter.

The interference processing module 160 can sum the resulting binary values for the clutter feature vector to determine an amount of motion corresponding to the frame that yield the range-Doppler map utilized to determine the clutter feature vector. The interference processing module 160 can compare a value of the sum to a first threshold (e.g., 9 dB) and a second threshold (e.g., 100 dB). In response to a determination that the value is greater than the first threshold and less than the second threshold, the interference processing module 160 can determine that the range-Doppler map corresponds to measurements while the vehicle 110 is in motion. In response to such a determination, the interference processing module 160 can update statistics representative of a model of short-range interference. To that point, the interference processing module 160 can determine an average, using an alpha filter a, for example, for a current frame k:

$$\overline{D}_k = (1-\alpha)\overline{D}_{k-1} + \alpha D_k \qquad (13)$$

where $D_k$ represents an incoming array of complex numbers representing the antenna array response, which is array of complex numbers. Without intending to be bound by theory and/or modeling, the average $\overline{D}_k$ is utilized as a representative value of the mean $\mu_c$ of the short-range interference present in the vehicular radar system 105. $\overline{D}_k$ is estimated only duration motion of the vehicle in order to ensure that, over time, only the interference signals are included in the estimation of interference. (While the vehicle is stationary, zero Doppler bins include a combination of interference signals and environmental signals.)

When the interference is normally distributed, averaging a great number of samples can provide an approximation of the expected value of the interference. In addition, the interference processing module 160 can determine a circular standard deviation $C_k$ of the approximated average $\overline{D}_k$. The interference processing module 160 can determine multiple values of $C_k$ for respective receive channel, using respective range-Doppler maps for the receive channels. The standard deviation $C_k$ is used as an indicator for the integrity of the estimated interference signal $\overline{D}_k$. This indication allows an operator to subtract only meaningful estimations from the antenna array response.

The interference processing module 160 can subtract the approximate average $\overline{D}_k$ from a range-Doppler map for a defined frame, for range-Doppler bins with low standard deviation. Specifically, a corrected value $D_k^*$ is determined as $$D_k^* = D_k - S_k \qquad (13)$$

where $S_k = \overline{D}_k$ if $C_k$ is less than a defined threshold and $S_k = 0$ otherwise. An example of a defined threshold is a value of 1.

Further, the interference processing module 160 can utilized at least the corrected values $D_k^*$ to generate a clutter-free array (also referred to as "clean array") of range-Doppler values by replacing range values at a defined Doppler shift in the zero-Doppler region with $D_k^*$. As is disclosed herein, the interference processing module 160 can supply clutter-free arrays for respective receive channels to the detector module 170 for object detection.

The vehicular radar system 105 can be functionally coupled to a control system (not depicted in FIG. 1A) that can receive object information indicative of one or more objects in the vicinity of the a vehicle 110. The object information can be generated by the detector module 170 using clutter-free range-Doppler maps in accordance with aspects described herein. The control system can implement a control process to adjust operation of the vehicle 110 using at least the object information. The adjusted operation can result in the vehicle 110 accelerating, decelerating, stopping, maneuvering, a combination thereof, or the like.

Figure 3:
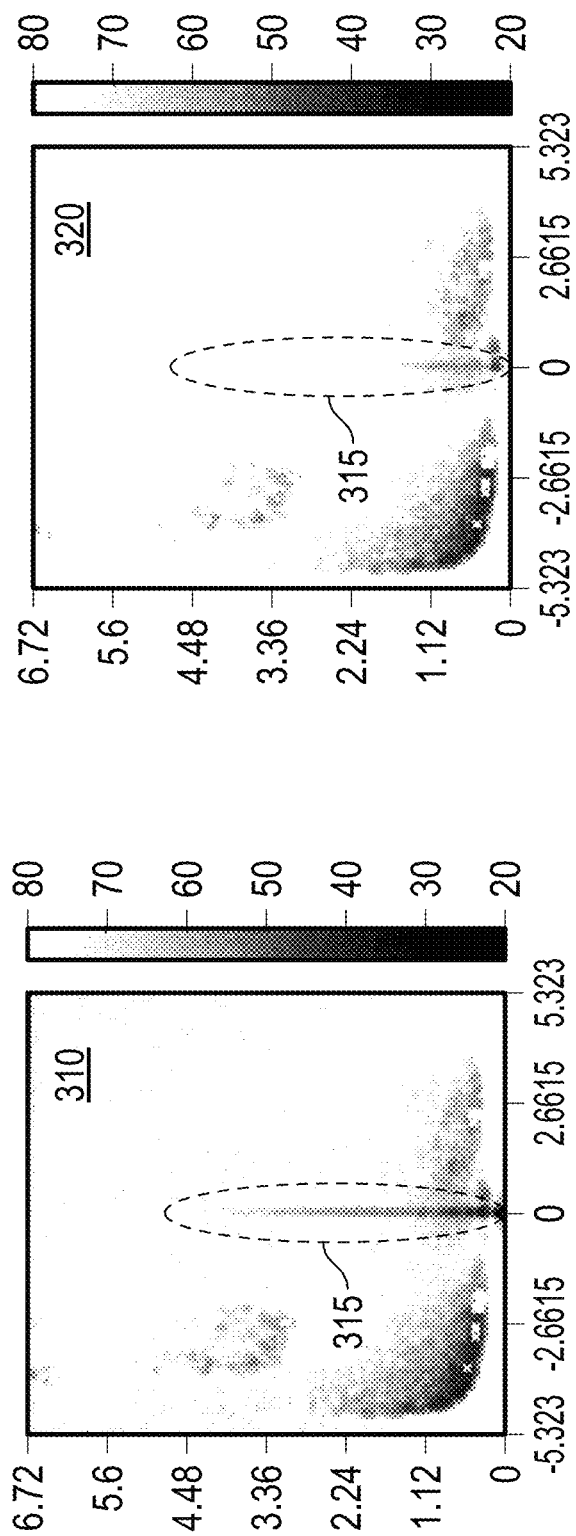
FIG. 3 presents an example of a range-Doppler map that illustrates mitigation of stationary interference in a vehicular radar system, in accordance with one or more embodiments of the disclosure.
Figure 3:
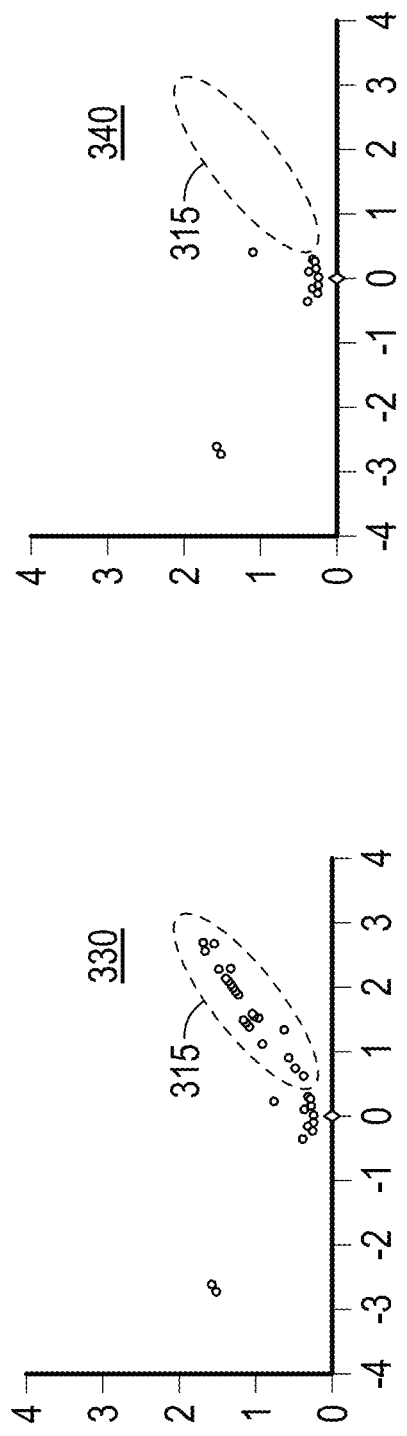

To illustrate performance of the techniques of this disclosure, FIG. 3 presents an example of a range-Doppler map 310 observed in a vehicular radar system (e.g., vehicular radar system 105), without removal of stationary interference. The range-Doppler map 310 presents amplitude of range-Doppler bins in a direction normal to a range-Doppler plane. As it can be gleaned from the range-Doppler map 310, a region 315 encompasses detections (represented by sizeable amplitudes) near zero-Doppler shift. Such detections also can be gleaned from diagram 330, which presents a top-view of the range-Doppler map 310, where the abscissa represents range (in units of meters) and the ordinate represents Doppler shift (in units of meters). The detections in the region 315 can be ascribed to short-range echo originating, for example, from fascia of a vehicle (e.g., an vehicle 110) that includes the vehicular radar system and/or a radome or another type of housing that contains at least a portion of the vehicular radar system.

After applying the techniques of this disclosure, effects of stationary interference can be removed from the range-Doppler map 310. Specifically, removal of stationary interference according to aspects of this disclosure yield the range-Doppler map 320, where most all detections within the region 315 are removed. As it can be seen in diagram 340, no detections remain within region 315 after the techniques of this disclosure are applied to the range-Doppler map 310.

Figure 4:
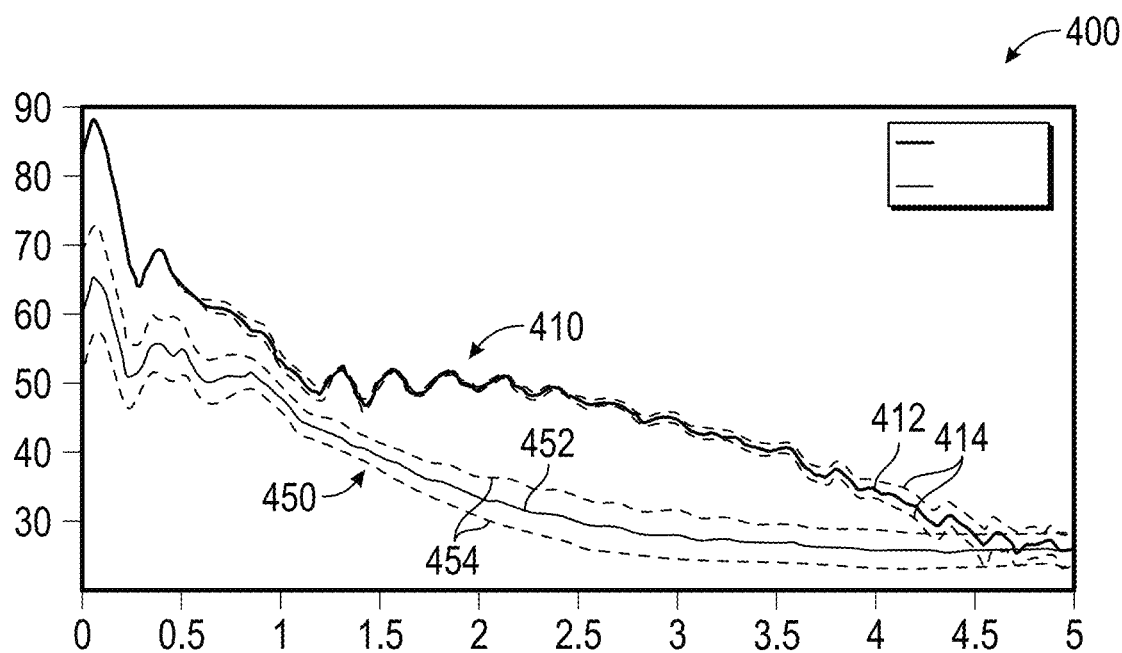
FIG. 4 presents an example diagram of average zero-Doppler amplitude in the presence and absence of mitigation of stationary interferences in a vehicular radar system, in accordance with one or more embodiments of the disclosure.

To further illustrate performance of the techniques of this disclosure, FIG. 4 presents an example plot 400 of average zero-Doppler amplitude in the presence and absence of mitigation of stationary interferences in a vehicular radar system, in accordance with one or more embodiments of the disclosure. More specifically, traces 410 present average zero-Doppler amplitude (solid line 412) and standard deviation (dashed lines 414) over a defined time interval (e.g., 12603 frames or approximately 21 minutes) of measurements, before removing stationary interference in accordance with aspects of this disclosure. In contrast, traces 450 present average zero-Doppler amplitude (solid line 452) and standard deviation (dashed lines 454) over the same defined time interval, after removing stationary interference in accordance with aspects of this disclosure.

Figure 5:
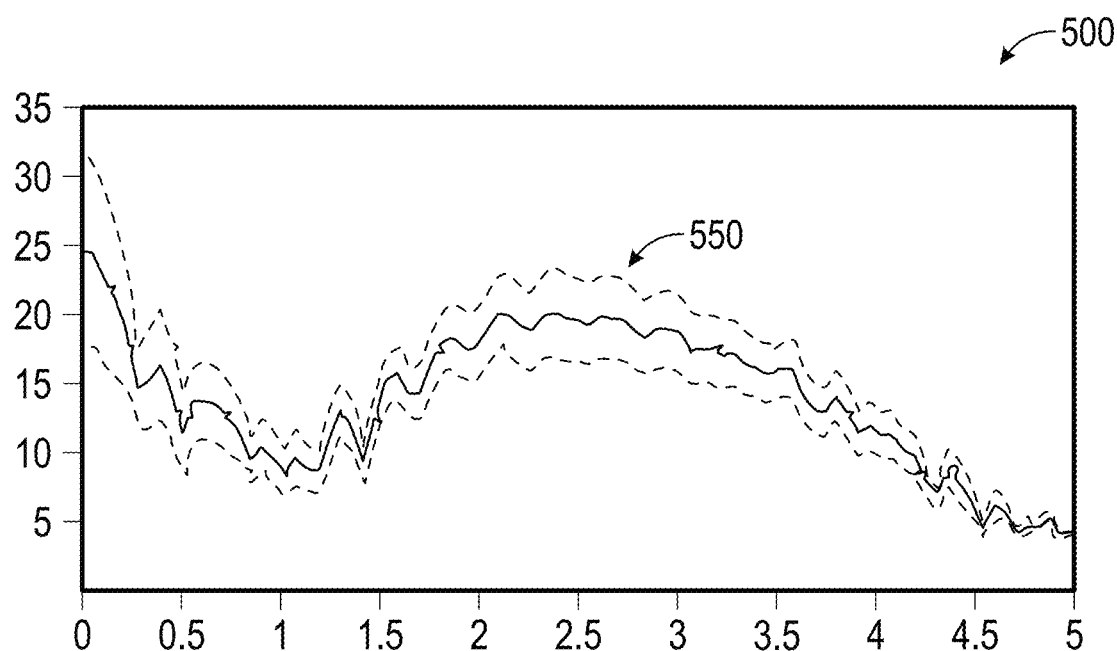
FIG. 5 presents an example of stationary-interference attenuation in a vehicle radar system, in accordance with one or more embodiments of the disclosure.

Further, FIG. 5 illustrates an example chart plot 500 that illustrates an amount of attenuation of short-range interference caused by fascia of a vehicle 110, FIG. 1A that includes a vehicular radar system 105, FIG. 1A, in accordance with one or more embodiments of the disclosure. As is illustrated by traces 550, the amount of attenuation depends on range and the average attenuation is equal to about 12.3 dB, with a minimum of about 5 dB, at short ranges, and a maximum of 23 dB.

Figure 6:
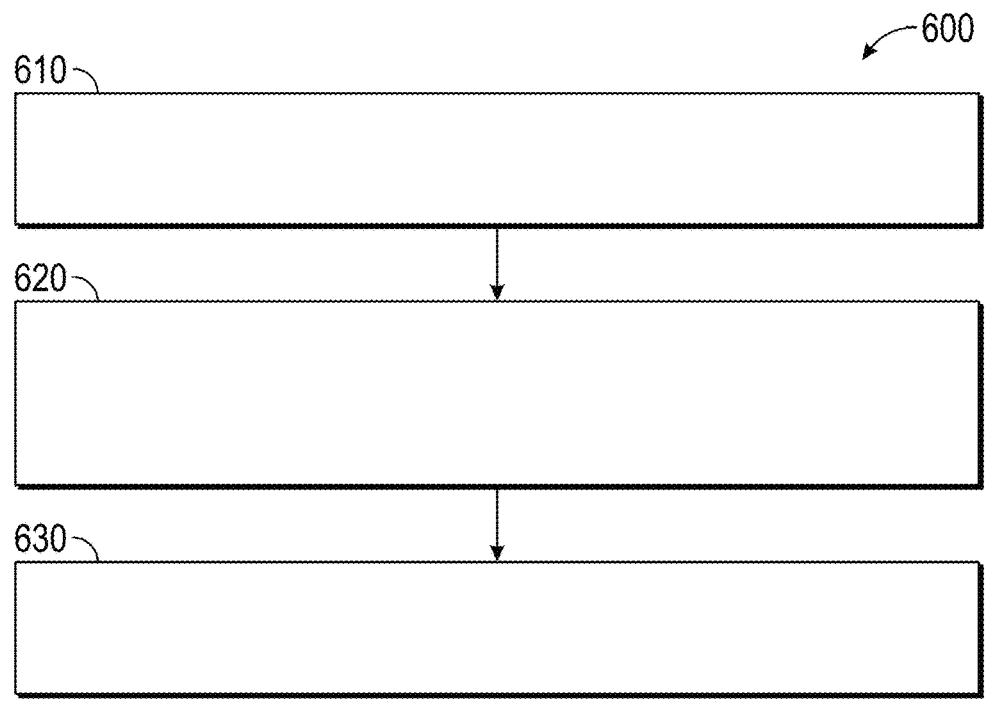
FIG. 6 presents an example of a method for mitigating stationary interference in a vehicular radar system, in accordance with one or more embodiments of the disclosure.

FIG. 6 illustrates a flowchart of an example method 600 for mitigating stationary interference in a vehicular radar system, in accordance with one or more embodiments of the disclosure. As mentioned, the vehicular radar system can be mounted in an automobile or another type of vehicle. The example method 600 can be implemented, entirely or in part, by the vehicular radar system (e.g., vehicular radar system 105, FIG. 1A) in accordance with this disclosure. The disclosure, however is not limited in that respect and any computing system having one or more processors, one or more memory devices, and/or other types of computing resources also can implement, entirely or in part, the example method 600. In some embodiments, the computing system can embody, or can include, a portion of the vehicular radar system. For instance, in one embodiment, the computing system can embody, or can include, the range module 140, FIG. 1A, the Doppler module 150, FIG. 1A, the interference processing module 160, FIG. 1A, and/or the detector module 170, FIG. 1A, in accordance with aspects of this disclosure.

At block 610, the vehicular radar system can generate an estimate of an amount of short-range interference present in incoming radar signals during motion of the vehicular radar system. As mentioned, the vehicular radar system (e.g., vehicular radar system 105) is mounted on a vehicle, such as an automobile, aircraft, agricultural machinery, or the like. Regardless of type, the vehicle can be manned or unmanned. At block 620, the vehicular radar system can subtract the amount of short-range interference from each radar data array (e.g., range-Doppler map) from a group of radar data arrays corresponding to respective receiver channels. The subtracting operation results in a group of clutter-free radar data arrays. At block 630, the vehicular radar system can perform object detection and/or DOA detection using at least the group of clutter-free radar data arrays.

Figure 7:
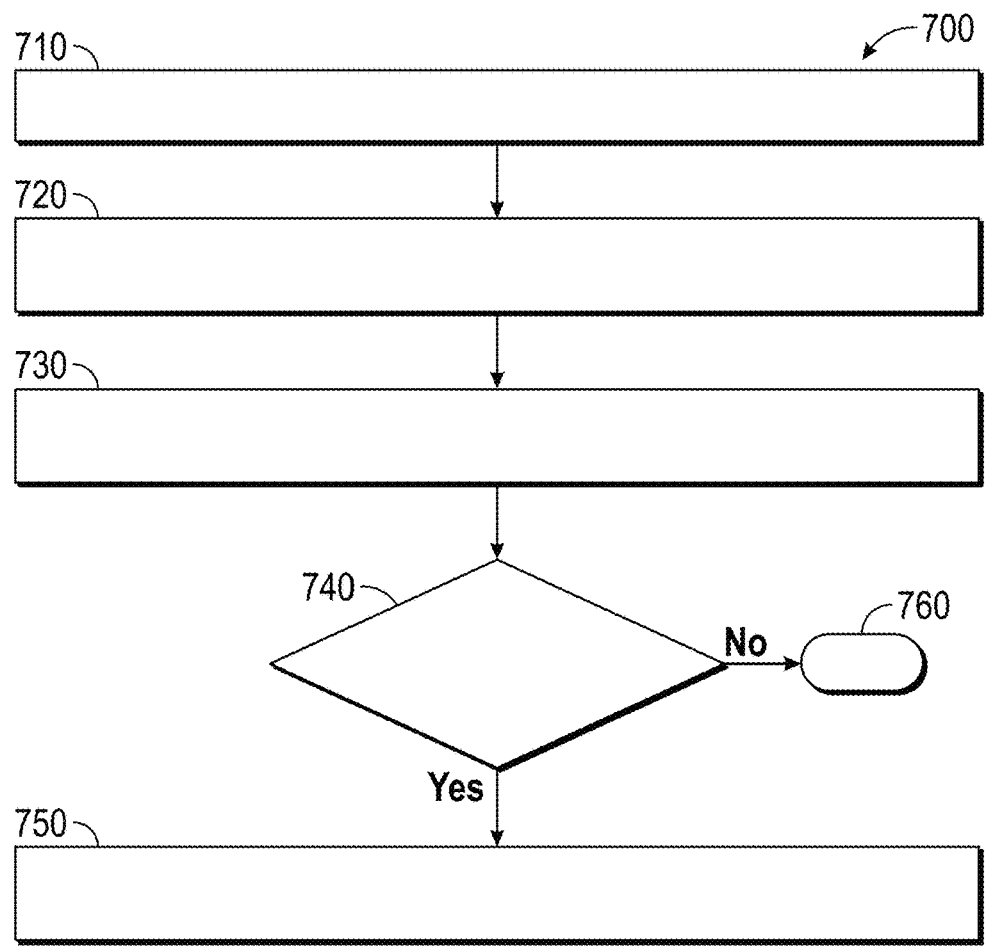
FIG. 7 presents an example of a method for learning a model of statistics of short-range interference, in accordance with one or more embodiments of the disclosure.

FIG. 7 illustrates a flowchart of an example method 700 for generating an estimate of an amount of short-range interference in a vehicular radar system, in accordance with one or more embodiments of the disclosure. As is described herein, generating such an estimate can include learning a model of statistics (a means and a variance, for example) of short-range interference. The example method 700 can be implemented, entirely or in part, by the vehicular radar system (e.g., vehicular radar system 105) in accordance with this disclosure. As mentioned, the disclosure is not limited in that respect and any computing system having one or more processors, one or more memory devices, and/or other types of computing resources also can implement, entirely or in part, the example method 700. In some embodiments, the computing system can embody, or can include, a portion of the vehicular radar system. For instance, in one embodiment, the computing system can embody, or can include, the range module 140, FIG. 1A, the Doppler module 150, FIG. 1A, the interference processing module 160, FIG. 1A, and/or the detector module 170, FIG. 1A, in accordance with aspects of this disclosure.

At block 710, the vehicular radar system can configure a non-Doppler region within a range-Doppler map. At block 720, the vehicular radar system determines a clutter feature vector for the range-Doppler map excluding the non-Doppler region. At block 730, the vehicular radar system determines an amount of motion present in the clutter feature vector. At block 740, the vehicular radar system determines if the amount of motion satisfies a defined criterion. In response to a negative determination, the example method 700 ends. In contrast, in response to a positive determination, the vehicular radar system updates statistics for short-range interference based at least on a channel corresponding to the range-Doppler map.

Figure 8:
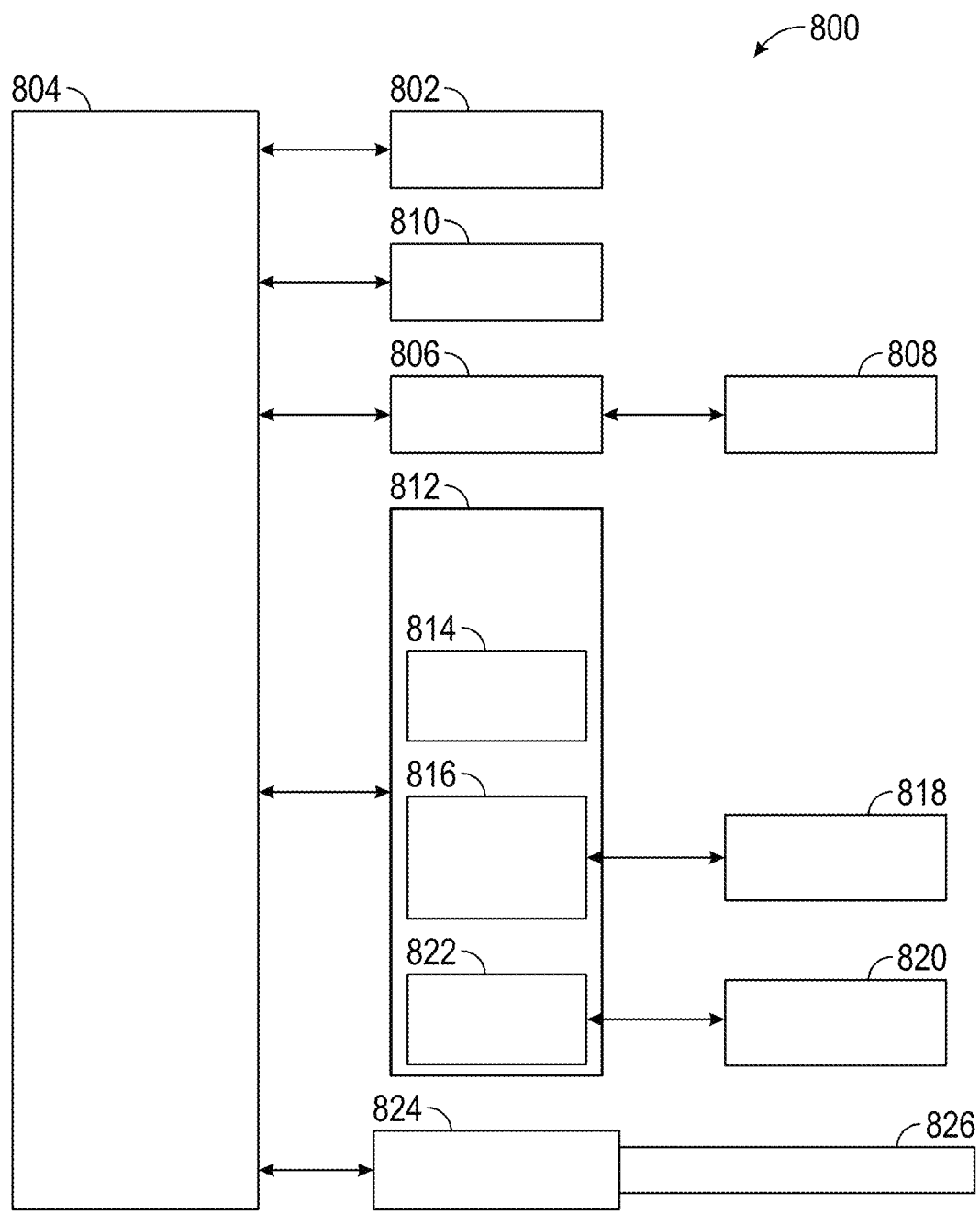
FIG. 8 presents an example of a computing system that can implement adaptive mitigation of stationary interference in a vehicular radar system, in accordance with one or more embodiments of the disclosure.

FIG. 8 presents an example of a computing system 800 that can be used to implement one or more embodiments of this disclosure. Computing system 800 can correspond to, at least, a system that is configured to test various systems, for example. Computing system 800 can correspond to an interface device, a conversion device, and/or a network simulation device. Computing system 800 can be used to implement hardware components of systems configured to perform the numerous methods described herein (e.g., methods 600, 700). Although one example computing system 800 is shown, computing system 800 includes a communication path 826, which connects, via a communication interface 824, the computing system 800 to one or more additional systems (not depicted in FIG. 8). Computing system 800 and the additional system(s) can be in communication via the communication path 826 and the communication interface 824, e.g., to communicate data between them.

Computing system 800 includes one or more processors, such as processor 802. Processor 802 is connected to a communication infrastructure 804 (e.g., a communications bus, cross-over bar, or network). Computing system 800 can include a display interface 806 that forwards graphics, textual content, and other data from communication infrastructure 804 (or from a frame buffer not shown) for display on a display unit 808. Computing system 800 also includes a main memory 810, preferably random access memory (RAM), and can also include a secondary memory 812. There also can be one or more disk drives 814 contained within secondary memory 812. Removable storage drive 816 reads from and/or writes to a removable storage unit 818. As will be appreciated, removable storage unit 818 includes a computer-readable medium having stored therein computer software and/or data.

In alternative embodiments, secondary memory 812 can include other similar means for allowing computer programs or other instructions to be loaded into the computing system. Such means can include, for example, a removable storage unit 820 and an interface 822.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   transmitting a radio wave from a transmit antenna of a radar system of the vehicle during motion of the vehicle;
   receiving, at a plurality of receive antennae of the radar system, return signals that include echo radio waves from an object receptive to the transmitted radio wave and short-range interference;
   generating a plurality of radar data arrays for the return signals, wherein each radar data array includes a range-Doppler map that represents the return signal received at a corresponding receiver antenna while the vehicle is in motion;
   estimating an amount of short-range interference present in the return signal of each radar data array by determining an average of the return signal while the vehicle is in motion;
   subtracting the estimate of short-range interference from each of the radar data array when a standard deviation of the average is less than a defined threshold to obtain a plurality of clutter-free radar data arrays;
   detecting the object using the plurality of clutter-free radar data arrays; and
   navigating the vehicle with respect to the object based on the detection of the object;
   wherein the plurality of radar data arrays includes respective range-Doppler maps, and wherein estimating the amount of short-range interference further comprises learning a stochastic model of the short-range interference based at least on one of the respective range-Doppler maps.

2. The method of claim 1, wherein detecting the object further comprises detecting at least one of a range and a direction of arrival of the object.

3. The method of claim 2, wherein detecting the object further comprises solving an optimization problem with respect to a maximum likelihood function based at least one of the plurality of clutter-free radar data arrays.

4. The method of claim 3, further comprising solving the optimization problem with respect to an approximation of the maximum likelihood function.

5. The method of claim 4, wherein the approximation further comprises an incoherent summation over the plurality of clutter-free arrays.

6. The method of claim 2, wherein estimating the amount of short-range interference further comprising determining a clutter feature vector for a range-Doppler map, the clutter feature vector excluding a non-Doppler region of the range Doppler map, wherein a Doppler value of the clutter feature vector corresponding to a Doppler bin of the range-Doppler map is a sum of values over selected range bins for the Doppler bin.

7. A radar system of a vehicle, comprising:
   a transmit antenna configured to transmit a radio wave from the radar system;
   plurality of receive antennae configured to receive echo radio waves from an object receptive to the transmitted radio wave, wherein the echo radio waves includes short-range interference;
   a processor configured to: generate a plurality of radar data arrays for the return signals, wherein each radar data array includes a range-Doppler map that represents the return signal received at a corresponding receiver antennae while the vehicle is in motion;
   estimate an amount of short-range interference present in the return signal of each radar data array by determining an average of the return signal while the vehicle is in motion; subtract the estimate of short-range interference from each of the radar data array when a standard deviation of the average is less than a defined threshold to obtain a plurality of clutter-free radar data arrays; and
   detect the object using at least the plurality of clutter-free radar data arrays;
   wherein the plurality of radar data arrays includes respective range-Doppler maps, and wherein the processor is further configured to estimate the amount of short-range interference by learning a stochastic model of the short-range interference based at least on one of the respective range-Doppler maps.

8. The radar system of claim 7, wherein the processor is further configured to detect the object by detecting at least one of a range and a direction of arrival of the object.

9. The radar system of claim 7, wherein the processor is further configured to detect the object by solving the optimization problem with respect to a maximum likelihood function based at least one of the plurality of clutter-free radar data arrays.

10. The radar system of claim 9, wherein the processor further configured to solve the optimization problem with respect to an approximation of the maximum likelihood function.

11. The radar system of claim 10, wherein the approximation further comprises an incoherent summation over the plurality of clutter-free arrays.

12. The radar system of claim 7, wherein the processor is further configured to estimate the amount of short-range interference by determining a clutter feature vector for a range-Doppler map, the clutter feature vector excluding a non-Doppler region of the range Doppler map, wherein a Doppler value of the clutter feature vector corresponding to a Doppler bin of the range-Doppler map is a sum of values over selected range bins for the Doppler bin.

13. A vehicle, comprising: a radar system including:
    a transmit antenna configured to transmit a radio wave from the radar system;
    a plurality of receive antennae configured to receive echo radio waves from an object receptive to the transmitted radio wave, wherein the echo radio waves includes short-range interference;
    a processor configured to: generate a plurality of radar data arrays for the return signals, wherein each radar data array includes a range-Doppler map that represents the return signal received at a corresponding receiver antennae while the vehicle is in motion;

estimate an amount of short-range interference present in the return signal of each radar data array by determining an average of the return signal while the vehicle is in motion;

subtract the estimate of short-range interference from each of the radar data array when a standard deviation of the average is less than a defined threshold to obtain a plurality of clutter-free radar data arrays; and detect the object using at least the plurality of clutter-free radar data arrays;

wherein the plurality of radar data arrays includes respective range-Doppler maps, and wherein the processor is further configured to estimate the amount of short-range interference by learning a stochastic model of the short-range interference based at least on one of the respective range-Doppler maps; and a navigation system configured to navigate the vehicle based on the detection of the object.

14. The vehicle of claim 13, wherein the processor is further configured to detect at least one of a range and a direction of arrival of the object.

15. The vehicle of claim 13, wherein the processor is further configured to detect the object by solving an optimization problem with respect to a maximum likelihood function based at least one of the plurality of clutter-free radar data arrays.

16. The vehicle of claim 13, wherein the processor is further configured to solve the optimization problem with respect to an approximation of the maximum likelihood function.

17. The vehicle of claim 13, wherein the processor is further configured to estimate the amount of short-range interference by determining a clutter feature vector for a range-Doppler map, the clutter feature vector excluding a non-Doppler region of the range Doppler map, wherein a Doppler value of the clutter feature vector corresponding to a Doppler bin of the range-Doppler map is a sum of values over selected range bins for the Doppler bin.

* * * * *